3,651,177
THERMOPLASTIC POLYMER COMPOSITIONS AND PROCESS OF MAKING THE SAME
Kazuo Saito, 912 Irving Ave., Syracuse, N.Y. 13210; and Takeshi Tanaka and Ichiro Saito, both of 700 Torigai-mishi, Mishima-cho, Osaka, Japan
No Drawing. Continuation of applications Ser. No. 470,193, July 7, 1965, and Ser. No. 502,396, Oct. 22, 1965. This application June 27, 1969, Ser. No. 837,310
Claims priority, application Japan, Jan. 25, 1965, 40/3,924, 40/3,926
Int. Cl. C08f *19/08, 41/12*
U.S. Cl. 260—876 R                                   15 Claims

ABSTRACT OF THE DISCLOSURE

Thermoplastic vinyl resins having high transparency and high impact resistance, consisting of a polybutadiene interpolymer or containing such interpolymer blended with a vinyl chloride polymer, said interpolymer being formed in two stages, in the first of which a butadiene polymer consisting of polybutadiene or containing at least 50% butadiene is polymerized with monomeric methyl methacrylate and in the second of which, monomeric aromatic vinyl compound is polymerized with the graft polymer formed in the first stage, the methyl methacrylate comprising from 10% to 80% of the total monomer addition, and the vinyl aromatic monomer comprising from 90% to 20% thereof; such polymerization being effected in an aqueous medium which contains, in relation to 100 parts of total resinous constituents, from 0.5 to 10.0 parts of formaldehyde sulfoxylic salt and effective amounts up to 3 parts of peroxides; at least 80% of said butadiene polymer at the start being in the form of particles below $0.2\mu$ in diameter where the interpolymer is to be blended with vinyl chloride polymer, and below $0.1\mu$ in diameter where the interpolymer is to be used alone; said butadiene polymeric material constituting out of each 100 parts of total resinous constituents, from 20 to 70 parts when the interpolymer is to be blended with vinyl chloride polymer, and from 20 to 60 parts when the interpolymer is to be used alone, the remainder of each 100 parts consisting of the sum of the monomeric additions.

---

This application is a continuation and consolidation of our application Ser. No. 470,193, filed July 7, 1965, and Serial No. 502,396, filed Oct. 22, 1965, both now abandoned. Both of said applications claim priority from Jan. 25, 1965, on which date corresponding applications were filed in Japan.

The present invention relates primarily to a method of manufacturing thermoplastic vinyl resin polymers, and it is specifically concerned with the efficient production, on an industrial scale, of an interpolymer formed by polymerizing a rubbery butadiene polymer with monomeric methyl methacrylate to form a graft polymer, and thereafter polymerizing the graft polymer with monoethylenically unsaturated aromatic hydrocarbon. The thermoplastic butadiene interpolymer so produced is independently useful as a molding material which yields products having excellent impact resistance and transparency—characteristics heretofore deemed mutually exclusive. The interpolymer can also be blended with resinous material of the vinyl chloride type to form highly useful thermoplastic compositions having enhanced impact resistance and transparency.

Vinyl chloride, methyl methacrylate and other vinyl monomers are widely used in the production of thermoplastic resins. Such products have a highly desired combination of properties; they are transparent, readily workable, resistant to chemicals and heat, and have high electrical insulating qualities, etc. In addition, they are light in weight and cheap in cost. For these reasons the vinyl plastics are widely used.

However, most of these plastics have a common weakness in that they have little impact resistance, which, naturally, restricts the range of their applications.

For the purpose of improving their low impact resistance, methods of variously binding or blending rubbery material with vinyl resins have hitherto been proposed or attempted (refer to Japanese patent publications '53—1293, '56—7538, '58—2791, '59—8136, '64—22192, '60—3534, '61—9593 and '62—6720, etc.).

While many of these attempts have achieved considerable success in improving impact resistance, which was their objective, nevertheless they have done so only by simultaneously reducing the transparency of the plastic. The end products of these prior techniques were inevitably opaque and their potential utility greatly restricted, since transparency is one of the most important and highly desired properties of thermoplastic materials.

The present inventors have long endeavored to create vinyl-base thermoplastic materials possessing both excellent impact resistance, and also high transparency. The present invention affords an answer to this problem.

In essence, the improvement of this invention embraces a novel procedure for producing an interpolymer of butadiene with methyl methacrylate and monoethylenically unsaturated aromatic hydrocarbon, which interpolymer is independently useful as such, but can also be blended in conventional ways with vinyl chloride polymers to further enhance desirable plastic properties.

The improvement of this invention whereby the resulting interpolymer has high impact resistance and also is transparent involves forming the interpolymer from butadiene, methyl methacrylate and a monethylenically unsaturated aromatic hydrocarbon, in two stages. In the first stage a rubbery butadiene polymer is polymerized to form a graft polymer with monomeric methlly methacrylate. The first stage polymerization is carried out in an aqueous dispersion and in the presence of formaldehyde sulfoxylic salt and peroxide. In the second stage the butadiene-methyl methacrylate graft polymer is polymerized with monomeric monoethylenically unsaturated hydrocarbon to form the interpolymer. The invention is further characterized in that more than 80% of the dispersed butadiene particles employed in the first stage of polymerization are less than $0.1\mu$ in diameter. The invention is also characterized in that the polymerization reactions are carried out in the presence of from 0.5 to 10 parts (usually from about 2 parts to about 5 parts) of formaldehyde sulfoxylic salt per 100 parts of total resinous constituents and in the presence of a catalytically effective quantity of peroxide not in excess of 3 parts (usually from 0.1 to 1.4 parts) per 100 parts of total resinous constituents. A further characteristic of the invention is that the butadiene in the interpolymer does not exceed 60% of the weight thereof, the methyl methacrylate constituting from 10% to 80% by weight of the total monomers that were polymerized with the butadiene in the first and second stages.

Where the interpolymer is to be blended with a vinyl chloride resin, the ratio of the butadiene to the vinyl aromatic in the interpolymer can be increased. Thus, in such cases and in relation to each 100 parts of total polymerizable materials used in forming the interpolymer, one can use from 20–70 parts by weight of butadiene polymer and from 80–30 parts (combined weight) of monomeric methyl methacrylate and monoethylenically unsaturated aromatic hydrocarbon. Of the monomers from 10% to 80% should be methyl methacrylate and from 90% to 20% should be the monoethylenically unsaturated hydrocarbon. However, if the interpolymer is to be used as such, it is preferred to limit the butadiene polymer content of the interpolymer to from 20-60 parts of the total resin content, increasing the range of monomeric addition correspondingly.

Further, where the interpolymer is to be blended with vinyl chloride polymer, more than 80% of the particles of the butadiene polymer in the initial aqueous dispersion must be less than $0.2\mu$ in diameter. Where the interpolymer is to be used as such, however, more than 80% of the butadiene particles should be less than $0.1\mu$ in diameter, in order to simultaneously maximize the impact resistance and transparency.

As used herein the term rubbery butadiene polymers refers to polybutadiene and/or copolymers comprising from at least 50% butadiene and olefinic monomers having a capacity to polymerize therewith (e.g. acrylonitrile acrylic ester, methacrylic ester, vinyl aromatic chloroprene, etc.). They may be used singly or in mixtures of two or more kinds. Moreover, they are used in the state of an aqueous dispersion, more than 80% of the particles of which are less than $0.1\mu$ in diameter, where the butadiene interpolymer is to be used as such, or less than $0.2\mu$ in diameter where the interpolymer is to be blended with a resin of the vinyl-chloride type.

The vinyl aromatic monomers useful herein include: styrene, $\alpha$-methyl styrene, $\alpha$-ethyl styrene or nucleic replaced derivates (e.g., vinyl toluene, isopropenyl toluene, chlorostyrene, etc.). These can be used singly or in a mixture of two or more different kinds. They are sometimes referred to herein as monoethylenically unsaturated aromatic hydrocarbons.

As the formaldehydesulfoxylic salts to be used, may be mentioned sodium formaldesulfoxylate $$(NaSO_2CH_2OH \cdot 2H_2O)$$

zinc formaldehydesulfoxylate $(Zn[SO_2CH_2OH_2]_2)$, etc., these being used either singly or in mixtures of two or more kinds.

As the peroxides to be used, may be mentioned organic and inorganic peroxide, e.g. cumenehydroperoxide, diisopropylbenzene - hydroperoxide, tertiarybutylhydroperoxide, ditertiarybutylperoxide, methylethylketoneperoride, lauroylperoxide, benzoylperoxide, ammonium persulfate, sodium persulfate, potassium persulfate, hydrogen peroxide, etc., these being used singly or in mixtures of two or more kinds.

The vinyl chloride polymers used in this invention for blending with the interpolymer include: polyvinyl chloride and/or a copolymer of vinyl chloride more than 70% by weight and a monoolefinic monomer, less than 30% by weight, capable of copolymerization therewith (e.g. vinyl acetate, vinylidiene chloride, ester methacrylate, acrylonitrile, etc. may be mentioned). These may be obtained either by the method of emulsification, suspension or any other method.

A description will first be provided below of the method of manufacturing the interpolymer. In polymerization described herein, an emulsifier is employed.

An aqueous dispersion of the butadiene polymer, described above, is agitated. This system may include, in addition to the emulsifier, a polymerization initiator, polymerization regulator, latex stabilizer, etc.

First, methyl methacrylate is added, which then is polymerized with the butadiene polymer and after this polymerization is substantially finished, vinyl aromatic is added and polymerized, still in the presence of the formaldehydesulfoxylic salts and peroxide. Addition and polymerization of the monomer is commenced while the diameter of more than 80% of the particles of the dispersion remains below the stated maxima.

After the polymerization of aromatic vinyl monomer is substantially completed, the aqueous dispersion obtained is salted out and filtered, and its solid content is dried to obtain the interpolymer.

If desired, a thermal stabilizer, light stabilizer, processing agent, filler, coloring agent, or the like may be added. The interpolymer so produced may then be heated and molded, and thus an article, excellent in impact resistande, may be obtained. Where the interpolymer is to be blended with vinyl chloride resin, it is preferable to delay the addition of such auxiliary materials until that stage in the processing is reached.

By mixing the interpolymer obtained and vinyl chloride polymer, the desired compositions, which are excellent both in impact resistance and transparency, may be obtained. Any conventional method of mixing may be adopted, such as roll-mixing, Banbury mixing or mixing in the state of a liquid dispersion. The relative proportions of these two constituents may be varied over a wide range, since the butadiene interpolymers of this invention, like certain other butadiene interpolymers known to the art, are infinitely compatible with vinyl chloride resins. Even as small an amount as 3% of the butadiene interpolymer will enhance the impact resistance of the composition, and even as small an amount of vinyl chloride resin as 40% will improve the workability and transparency of the composition.

Salient among the functions and effects of this invention are:

(1) Where the butadiene interpolymer is to be blended with vinyl chloride resin, more than 80% by weight of the butadiene polymer particles in the aqueous dispersion are required to have a diameter smaller than $0.2\mu$.

When butadiene polymer particles not qualifying for the above condition or having a larger diameter, are used, the compositions obtained, while indicating a good impact resistance, are deprived of transparency, and, particularly, are inferior in tensile strength. Table 1, below, may eloquently indicate this fact.

TABLE 1

Relation between diameter of butadiene polymer particles and characteristic values. (PVC blend)

| Items | This invention | Control |
|---|---|---|
| Quantity (percent) of particles with diameter below $0.2\mu$  | 99 | 9. |
| Impact strength, izod with notch (ft. lb./inch) | Over 12 | Over 12 |
| Tensile strength (kg./cm.) | 490 | 420. |
| Transparency: | | |
| Macroscopical observation | Transparent. | Not transparent. |
| Coefficient of transmission of visible light (percent). | 80 | 44. |
| Haze value (percent) | 5 | 30. |

NOTES (a)

An aqueous dispersion was used, containing 25% of a copolymer consisting of butadiene 76.5% and styrene 23.5%.

(b)

To 40 parts of the butadiene/styrene copolymer in said dispersion, sodium formaldehydesulfoxylate, 2 parts, and cumenehydroperoxide, 1 part, were added. To this, 30 parts of methyl methacrylate were first added and polymerized, and then 30 parts of styrene were added and polymerized.

(c)

13 parts of the resulting interpolymer were roll kneaded with 87 parts of vinyl chloride polymer (degree of polymerization: 1000), for 10 minutes att 180° C. The product was pressed for 30 minutes at 190° C. The testpiece thus obtained was used.

(d)

The impact strength stated is the value at 20° C. by (ASTM [1]—D256–56; the same applies hereunder).

The tensile strength stated is the value at 20° C. (ASTM—D638–60T; the same applies hereunder).
The transparency stated is the value at 20° C. (JIS[2]—K6714; the same applies hereunder).

(2) In the presence of formaldehyde sulfoxylic salts and peroxide the monomers mentioned are added and polymerized sequentially. It is not known why, by so doing, the impact resistance is improved. The mechanism of the catalytic system is not fully clarified yet, but it is assumed that it is the result of the following important actions.

(a) Mere addition of formaldehyde sulfoxylic salts to an aqueous dispersion of butadiene polymer will not result to any marked extent in coagulation and enlarging of the butadiene polymer particles. The salt, which indicates neutrality in water, slowly disintegrates, and in the presence of methyl methacrylate (a water-soluble monomer) and peroxide, the dispersed particles are coagulated and swollen smoothly and stably. Thus the reaction mass is kept in the state of an aqueous dispersion, and at the same time, graft polymerization on the butadiene polymer is carried out in parallel.

As a result, a high impact resistance of the composition may be obtained, while its transparency is sufficiently retained. By way of contrast, when an aqueous solution of sodium bisulfate and aldehyde is added to rubber latex, the result will be an immediate drop of pH and a violent coagulation of the dispersed particles, and, consequently, the state of an aqueous dispersion is lost, rendering uniform and stable polymerization impossible.

(b) The formaldehyde sulfoxylic salts, along with the peroxides, effect a crosslinking reaction with the butadiene polymer, so that the impact resistance of the composition is increased.

The factors involved therein are as shown in Table 2.

TABLE 2

| Items | This invention | Control |
|---|---|---|
| Gel content (percent) of butadiene polymer: | | |
| Right before the addition of formaldehydesulfoxylic salt and peroxide | 0.5 | |
| Right before the addition of monomer | 57.5 | 15 |
| Average diameter of dispersed particle ($\mu$) in aqueous dispersion: | | |
| Right before the addition of formaldehydesulfoxylic salt and peroxide | 0.07 | |
| Right before the addition of monomer | 0.07 | 0.07 |
| At the time of end of methyl methacrylate polymerization | 0.1 | 0.08 |
| At the time of completion of entire polymerization | 0.15 | 0.09 |
| Impact strength, izod with notch (ft. lb./inch) at 20° C | Over 12 | 1.4 |

REMARKS (a) A rubber latex containing 99% of particles below 0.2$\mu$ in diameter, and containing 25% of a co-polymer consisting of butadiene, 76.5% and styrene, 23.5%, was used.

(b) To 40 parts of the rubber content, 30 parts of methyl methacrylate were first added and polymerized, and then 30 parts of styrene were added for polymerization, and thus the interpolymer was obtained. In the case of the polymer mentioned in the item "This Invention," hydrate of sodium formaldehydesulfoxylate, 2 parts, and cumenehydroperoxide, 1 part, were added before methyl methacrylate was added. For the "Control," only conventional amounts (0.4 part) of a standard redox catalyst was added.

(c) 13 parts of the interpolymer were kneaded with 87 parts of a vinyl chloride polymer (degree of polymerization: 1000), as mentioned previously, and values as shown here were obtained under the same conditions as in the case of Table 1.

[1] ASTM = American Society for Testing Materials.
[2] JIS = Japanese Industrial Standard.

Where the butadiene interpolymer is to be used as such, more than 80% of the butadiene particles in the aqueous dispersion are below 0.1$\mu$ in diameter. This is an indispensable condition in order to obtain transparency in such cases. When particles of larger diameter are used, an excellent impact resistance may be obtained but transparency will be inferior, and besides, tensile strength also, will be reduced.

This fact is indicated in Table 3.

TABLE 3

Relation between particle diameter of butadiene polymer and characteristic values (interpolymer used per se)

| Items | This invention | Control |
|---|---|---|
| Amount(percent) of particles of butadiene polymer, below 0.1 $\mu$ in diameter | 99 | 9 |
| Impact strength charpy value, 20 °C (Kg./cm./cm.$^2$) with notch, −30° C | 25.5<br>9.5 | 23.6<br>9.0 |
| Tensile strength (kg./cm.$^2$) | 360 | 320 |
| Transparency: | | |
| Coefficient of transmission of visible light (percent) | 79 | 45 |
| Haze value (percent) | 5 | 26 |

NOTES (a) An aqueous dispersion containing 25% of co-polymer particles was used. The co-polymer contained 76.5% of butadiene and 23.5% of styrene. Against 25 parts of such co-polymer, 3 parts of sodium formaldehydesulfoxyl-2 hydrate and 1 part of cumenehydroperoxide were added, and first, 40 parts of methylmethacrylate and 0.2 part of cumenehydroperoxide were added and polymerized, and then, 35 parts of styrene and 0.2 part of cumenehydroperoxide were added and polymerized. As a result, the desired polymer was obtained.

(b) All of the test pieces were roll-kneaded for 10 minutes at 180° C., and then press-molded for 30 minutes at 190° C.

(c) Impact strength—JIS K6745
Tensile strength—ASTM D638–60T
Transparency—JIS K6714

The effects of using formaldehyde sulfoxylic salts and peroxide on the properties of the butadiene interpolymer, per se, are indicated in Table 4.

TABLE 4

| Items | This invention | Control |
|---|---|---|
| Formaldehydesulfoxylic salts and peroxide | Added | Conventional |
| Impact strength charpy value, 20° C (Kg./cm./cm.$^2$) with notch, −30°. C | 25.5<br>9.5 | 3.5.<br>3.0. |
| Tensile strength (kg./cm.$^2$) | 360 | 370. |

NOTES

An aqueous dispersion containing 99% of the particles of butadiene polymer, used in the experiment of Table 3, less than 0.1$\mu$ in diameter, was used. The values shown above are those obtained under the same experimental conditions as in the case of Table 3.

(3) Butadiene polymer, methyl methacrylate and vinyl aromatic compound should be mixed at a fixed ratio.

As mentioned above, 80–30 parts of such monomers containing 10–80% of methyl methacrylate and 90–20% of vinyl aromatic compound are used, as against 20–70 parts of butadiene polymer for each 100 parts of total resin content, when the butadiene interpolymer is to be blended with vinyl chloride resin, but from 80–40 parts of monomer in relation to from 20–60 parts of butadiene when the interpolymer is to be used as such. When the amount of butadiene polymer is excessively small, a composition having little impact resistance only will result, or the compositions may be found to be turbid. If, on the other hand, the amount is excessively large, the transparency as well as tensile strength of the resulting composition will have deteriorated.

Again, in case the percentage occupied by methyl methacrylate in the monomer drops below 10%, the resulting compositions will carry a bluish turbidity, while, in case it rises above 80%, its transparency deteriorates and impact resistance likewise drops.

(4) First, methyl methacrylate (which is slightly water soluble) is added and polymerized, and, after this polymerization is substantially completed, vinyl aromatic compound is added and polymerized.

By virtue of the two factors, i.e. use of this method of polymerization and the addition of formaldehydesulfoxylic salt and peroxide, the resulting compositions will be provided with a high impact resistance, either in case it is processed at a high temperature or in case it is processed at low temperatures.

If one proceeds either by polymerizing a mixture of methyl methacrylate and vinyl aromatic compound, or, by first adding and polymerizing vinyl aromatic compound, and then adding and polymerizing methyl methacrylate to obtain an interpolymer, the impact resistance shown by the resulting compositions is not found to be adequate. First addition for polymerization of methyl methacrylate, a water soluble monomer, is very important, as detailedly shown in Table 5.

amounts increase. Their respective appropriate amounts are set at 0.5–10 parts for formaldehydesulfoxylic salt and less than 3 parts for peroxide. In most cases the optimum amount lies between about 2 parts and about 5 parts.

Formaldehydesulfoxylic salt will not have any noticeable effect for coagulation and enlarging of dispersed particles, for example, when its amount is 0.1 part against 100 parts of resin content, as is usual in conventional emulsion polymerization. In case the percentage of methyl methacrylate is below 10%, the final polymer will be bluish and non-transparent, while when it is above 80%, the transparency as well as impact resistance will deteriorate.

Below, this invention will be described in reference to embodiments, two of which illustrate its use where the interpolymer is blended with vinyl chloride polymer, and two of which show cases where the interpolymer is used alone.

Embodiment 1

An aqueous dispersion 160 parts containing 25% of co-polymer parts, 99% whereof are below $0.2\mu$ in diameter, and comprising 76.5% of butadiene, and 23.5% of

TABLE 5

Differences due to varying methods of addition of monomer

| Items | This invention | Control 1 | Control 2 |
| --- | --- | --- | --- |
| Method of addition of monomer in manufacture of interpolymer. | Addition of methyl methacrylate, followed by styrene. | Addition of mixture of methyl methacrylate and styrene. | Addition of styrene, followed by methyl methacrylate. |
| Properties of compound: | | | |
| Impact strength, 20° C. izod with notch (ft. lb./inch) | Over 12 | 4.0 | 3.5. |
| Transparency as seen by naked eye | Transparent | Slight bluish turbidity | Remarkable blue turbidity. |
| Coefficent of transmission of visible light (percent) | 80 | 77 | 72. |
| Haze value (percent) | 5 | 7 | 11. |

REMARKS

The experimental conditions were identical as in the case of Table 1.

Similarly, where the butadiene interpolymer is to be used as such, the effect of coagulation and enlarging of particles by formaldehydesulfoxylic salt and peroxide is stimulated by the addition first of a water soluble monomer, and, consequently, its function is made to progress smoothly. As a result, the impact resistance is improved, as indicated in detail in Table 6 below.

styrene, were poured, with 65 parts water, into the polymerizing vessel. Under the flow of a nitrogen current, the dispersion was agitated, being kept at a temperature of 60° C. Into the system, 2 parts of sodium formaldehydesulfoxylate dissolved in 15 parts of water, and 1 part of cumenehydroperoxide were added.

The dispersion was thoroughly agitated, and then there was added a mixture of methyl methacrylate, 30 parts, and cumenehydroperoxide, 0.2 part. Immediately before the addition of methyl methacrylate, 98% of the dispersed particles of the rubber polymer had a diameter

TABLE 6

| Items | This invention | Control 1 | Control 2 |
| --- | --- | --- | --- |
| Method of addition of monomer | First methyl methacrylate is added, followed by styrene. | Mixture of methyl methacrylate and styrene is added. | First styrene is added, followed by methyl methacrylate. |
| Impact strength, charpy value, 20° C (Kg./cm./cm.²) with notch, −30° C | 25.5 9.5 | 11.5 7.2 | 10.8. 6.9. |
| Transparency: | | | |
| Coefficient of transmission of visible light (percent) | 79 | 75 | 70. |
| Haze value (percent) | 5.0 | 6.0 | 7.5. |

NOTES

But for the method of addition of the monomer, the experimental conditions were identical with those of Table 3.

If, out of 100 parts of total amounts of butadiene polymer and monomer, the amount of butadiene polymer exceeds 60 parts (70 parts if the interpolymer is blended with polyvinyl chloride), tensile strength and transparency deteriorate.

The desirable amounts of formaldehydesulfoxylic salt and peroxide vary according to the conditions of polymerization, composition of the monomer, etc. However, so long as the stability of the dispersion is not impaired, the impact resistance will be improved according as the below $0.2\mu$. The conversion ratio of polymerization after 4 hours was 95%.

Then a mixture of styrene, 30 parts, and cumenehydroperoxide, 0.2 part, was added. Five hours later, the polymerization conversion amounted to 94%. Here, polymerization was stopped, and the dispersion was coagulated with hydrochloric acid and sodium chloride, and was filtered. The solid content was dried, and, thus, a powder-like interpolymer was obtained.

The interpolymer, 13 parts, and vinyl chloride resin (degree of polymerization: 1000), 87 parts, were roll-kneaded for 10 minutes at 180° C., along with tin mercaptide (stabilizer), 3 parts, and butyl stearate, 1 part, and press-molded for 30 minutes at 190° C. The test pieces thus obtained were tested, and the results shown in Table 7 were obtained.

TABLE 7

| | |
|---|---|
| Impact strength, Izod with notch (20° C.) (ft. lb./inch) | Over 12 |
| Tensile strength (20° C.) (kg./cm.²) | 490 |
| Thermal-deformation temperature (° C.) (18.6 kg./cm.²) | 70.1 |
| Transparency: | |
| Macroscopical observation | Transparent |
| Coefficient of transmission of visible light (percent) | 80 |
| Haze value (percent) | 5 |

The impact resistance showed an excellent value at 20° C., while transparency on the other hand, was found to be excellent, both in respect to the percentage of transmission of visible light, which was large, and haze value, which was small. Also, the tensile strength and thermal-deformation temperature, likewise, indicated satisfactory values.

Embodiment 2

An aqueous dispersion, 120 parts, containing polymer particles comprising 76.5% butadiene and 23.5% styrene, 92% of the quantity of which consist of particles below 0.2μ in diameter, together with 110 parts water, 2 parts hydrate of sodium formaldehydesulfoxylate, and 1 part isopropylbenzenehydroperoxide, were poured into the polymerizing vessel similarly as in the case of Embodiment 1, to which, then, a mixture of methyl methacrylate, 40 parts, and isopropylbenzenehydroperoxide, 0.2 part, was added.

Four hours later, the percentage of polymerization conversion amounted to 94%.

Then, a mixture of styrene, 30 parts, and diisopropylbenzenehydroperoxide, 0.2 part, was added. Five hours later, the percentage of polymerization conversion rate reached 93%.

The same after-treatment as in Embodiment 1 was carried out, and a powder-like interpolymer was obtained.

60 parts of the interpolymer and 40 parts of a copolymer (degree of polymerization: 1300) consisting of vinyl chloride, 95%, and vinyl acetate, 5%, were roll-kneaded for 10 minutes at 180° C., along with tin mercaptide, 3 parts, and butyl stearate, 1 part, and then, was pressed for 30 minutes at 190° C., and, thus, test pieces were obtained.

The results of test, to which this test piece was subjected, was as shown in Table 8.

TABLE 8

| | |
|---|---|
| Impact strength, Izod with notch (20° C.) (ft. lb./inch) | Over 12 |
| Tensile strength (kg./cm.²) | 405 |
| Thermal-deformation temperature (° C.) (18.6 kg./cm.²) | 75.1 |
| Transparency: | |
| Macroscopical observation | Transparent |
| Coefficient of transmission of visible light (percent) | 75 |
| Haze value (percent) | 7 |

Embodiment 3.—Butadiene interpolymer, per se

An aqueous dispersion, 210 parts, containing 25 parts of the particles of a co-polymer, consisting of butadiene 76.5%, and styrene, 23.5%, 99% thereof being less than 0.1μ diameter, was fed to the polymerizing vessel.

This was kept under an oxygen current, at 60° C. within the vessel and to it were added 3 parts of sodium formaldehydesulfoxyl-2 hydrate dissolved in 15 parts of water, and 1 part of cumenehydroperoxide. The mixture then was agitated for one hour, and to it were added 40 parts of methyl methacrylate and 0.2 part of cumenehydroperoxide, for polymerization. Immediately prior to the addition of methyl methacrylate, 98% of the dispersed particles were below 0.1μ in diameter. Five hours later, polymerization conversion was 93.5%. To this material, a mixture of 35 parts of styrene and 0.2 part of cumenehydroperoxide was added for polymerization.

Five hours later, polymerization conversion amounted to 93%. At this point, polymerization was suspended. An aqueous solution of hydrochloric acid and table salt was added for coagulation, filtering and drying, and, thus, a powder-like polymer, 94 parts, was obtained.

The product was roll-kneaded for 20 minutes at 180° C. and pressed for 30 minutes at 190° C. From the test piece thus adjusted, the test results of Table 9 were obtained.

TABLE 9

| Items: | Results |
|---|---|
| Impact strength (20° C.) | 25.5 |
| Charpy value (−30° C.) (kg. cm./cm.²) with notch | 9.5 |
| Tensile strength (kg./cm.²) | 360 |
| Transparency: | |
| Coefficient of transmission of visible light (percent) | 79 |
| Haze value (percent) | 5 |

NOTE

The experimental method was the same with the case of Table 3.

Embodiment 4

An aqueous dispersion, 220 parts, containing polybutadiene particles, 40 parts, 92% thereof being below 0.1μ in diameter, sodium formaldehydesulfoxyl-2 hydrate, 4 parts, dissolved in water, 20 parts, and cumenehydroperoxide, 1 part, were fed into a polymerizing vessel in the same way as in Embodiment 1. A mixture of methyl methacrylate, 30 parts, and cumenehydroperoxide, 0.2 part, was added for polymerization.

Four hours later, polymerization conversion was 95%. Then styrene, 30 parts, and cumenehwdroperoxide, 0.2 part, were mixed and added for polymerization. Five hours later, the polymerization conversion amounted to 94%.

Through a similar treatment as in Embodiment 3, a powder polymer, 96 parts, was obtained.

This polymer was tested under the same conditions as in Embodiment 3 and the results of Table 10 were obtained.

TABLE 10

| Items: | Results |
|---|---|
| Impact strength (20° C.) | 32.6 |
| Charpy value (−30° C.) (kg. cm./cm.²) with notch | 10.8 |
| Tensile strength (kg. cm.²) | 295 |
| Transparency: | |
| Coefficient of transmission of visible light (percent) | 75 |
| Haze value (percent) | 7 |

We claim:

1. In a process of making a thermoplastic interpolymer from butadiene, methyl methacrylate and monoethylenically unsaturated aromatic hydrocarbon, the improvement whereby the resulting interpolymer has high impact resistance and is transparent, which comprises effecting the formation of the interpolymer in an aqueous dispersion and in the presence of formaldehyde sulfoxylic salt and peroxide in two stages, in the first stage polymerizing a rubbery butadiene polymer with monomeric methyl methacrylate, and in the second stage polymerizing the butadiene-methyl methacrylate graft polymer so formed with monomeric monoethylenically unsaturated aromatic hydrocarbon to form the interpolymer; said improvement being further characterized in that more than 80% of the dispersed butadiene particles employed in the first stage of polymerization are less than 0.1μ in diameter, and in that the polymerization reactions are carried out in the presence of from 0.5 to 10 parts of formaldehyde sulfoxylic salt per 100 parts of total resinous constituents and in the presence of a catalytically effective quantity of peroxide not in excess of 3 parts per 100 parts of total resinous constituents, and wherein from 20% to 60% by weight of the butadiene polymer is polymerized in stages one and two with from 80% to 40% of the monomeric components to form 100 parts of the interpolymer, the methyl methacrylate representing from 10% to 80% of the total weight of the monomeric materials added in the first and second stages.

2. The improved process of claim 1, wherein the formaldehyde sulfoxylic salt is present in proportions of from about 2 parts to about 5 parts in relation to each 100 parts of total resinous constituents.

3. The improved process according to claim 1 wherein the butadiene polymer is polybutadiene.

4. The improved process according to claim 1 wherein the butadiene polymer is a butadiene copolymer containing at least 50% of butadiene.

5. The improved process according to claim 4 wherein the butadiene copolymer is a butadiene-styrene copolymer.

6. The improved process according to claim 1 wherein the monoethylenically unsaturated aromatic hydrocarbon in the second stage of polymerization is styrene.

7. The process of making a thermoplastic composition whereby the resulting thermoplastic composition is highly transparent and also has high impact resistance by blending a vinyl chloride polymer containing at least 70% polyvinyl chloride with an interpolymer made in accordance with claim 1.

8. The process of making a thermoplastic composition whereby the resulting thermoplastic composition is highly transparent and also has high impact resistance by blending a vinyl chloride polymer containing at least 70% polyvinyl chloride with an interpolymer made in accordance with claim 4.

9. The interpolymer produced by the method of claim 1

10. The thermoplastic composition produced by the method of claim 7.

11. In a process of making a thermoplastic composition by blending a vinyl chloride polymer with an interpolymer containing butadiene, methyl methacrylate and monoethylenically unsaturated aromatic hydrocarbon, the improvement whereby the resulting thermoplastic composition has high impact resistance and is transparent and which comprises effecting the formation of the butadiene interpolymer in two stages in an aqueous dispersion and in the presence of formaldehyde sulfoxylic salt and peroxide, in the first stage polymerizing a rubbery butadiene polymer with monomeric methyl methacrylate, and in the second stage polymerizing the butadiene-methyl methacrylate graft polymer from the first stage with monomeric monoethylenically unsaturated aromatic hydrocarbon, the resulting interpolymer being thereafter blended with the vinyl chloride polymer, said improvement being further characterized in that more than 80% of the dispersed butadiene particles employed in the first stage polymerization are less than $0.2\mu$ in diameter; and in that the polymerization reactions are carried out in the presence of from 0.5 to 10 parts formaldehyde sulfoxylic salt per 100 parts of total resinous constituents and in the presence of a catalytically effective quantity of peroxide not in excess of 3 parts per 100 parts of total resinous constituents; and in that from 20 to 70 parts by weight of the butadiene polymer are polymerized in stages one and two with from 80 to 30 parts of the monomeric components to form 100 parts of the interpolymer, the methyl methacrylate representing from 10 to 80% of the total weight of the monomeric materials added in the first and second stages.

12. The improved process of claim 11, wherein the formaldehyde sulfoxylic salt is present in proportions of from about 2 parts to about 5 parts in relation to each 100 parts of total resinous constituents.

13. The improved process according to claim 11, wherein the rubbery butadiene polymer is a polymer of butadiene and styrene.

14. The improved process according to claim 13, wherein the monoethylenically unsaturated hydrocarbon is styrene.

15. The thermoplastic composition produced according to the process of claim 11.

References Cited

UNITED STATES PATENTS

| | | | |
|---|---|---|---|
| 3,287,443 | 11/1966 | Saito et al. | 260—876 |
| 3,288,886 | 11/1966 | Himei et al. | 260—876 |
| 3,296,339 | 1/1967 | Feuer | 260—879 |

FOREIGN PATENTS

| | | | |
|---|---|---|---|
| 850,487 | 10/1960 | Great Britain | 260—876 |

MURRAY TILLMAN, Primary Examiner

H. ROBERTS, Assistant Examiner

U.S. Cl. X.R.

260—29.7 UA, 880 R